United States Patent [19]
Lee

[11] Patent Number: 5,159,437
[45] Date of Patent: Oct. 27, 1992

[54] TELEVISION SIGNAL CONVERTING APPARATUS

[75] Inventor: Gi-seok Lee, Suwon, Rep. of Korea

[73] Assignee: Samsung Electronics Co., Ltd., Kyunggi, Rep. of Korea

[21] Appl. No.: 798,820

[22] Filed: Nov. 27, 1991

[30] Foreign Application Priority Data

Sep. 28, 1991 [KR] Rep. of Korea .................. 91-17013

[51] Int. Cl.$^5$ ...................... H04N 11/20; H04N 7/01
[52] U.S. Cl. ...................................... 358/11; 358/140
[58] Field of Search ............................. 358/11, 140

[56] References Cited

U.S. PATENT DOCUMENTS

5,070,395  12/1991  Kitaura .............................. 358/11
5,103,308   4/1992  Asano ............................... 358/140

Primary Examiner—Howard W. Britton
Attorney, Agent, or Firm—Rothwell, Figg, Ernst & Kurz

[57] ABSTRACT

A television signal converting apparatus for converting an arbitrary television signal into a different type television signal is disclosed. The apparatus includes an adaptive scanning line number converter for separating a video signal into a luminance signal and chrominance signal according to a different vertical correlation based on a screen mode, and a time axis adjustor for sampling the luminance and the chrominance signals separated in the adaptive scanning line number converter by the scanning line number corresponding to the screen mode and for horizontally lengthening the sampled luminance and chrominance signals.

2 Claims, 5 Drawing Sheets

TELEVISION SIGNAL CONVERTING APPARATUS

BACKGROUND OF THE INVENTION

The present invention relates to an apparatus for converting an arbitrary type television signal into a different type television signal, and more particularly to an apparatus for converting an arbitrary type televison signal to a different type television signal to have plural aspect ratios.

Current television systems are different according to nations and regions. These differences are in the number of scanning lines, the aspect ratio of the screen, the scanning method, etc. Further, current television systems have limited resolutions. Accordingly, a television system having a higher resolution than those of current systems is being developed. One recently developed television system having a higher resolution is a high definition television system called "MUSE type (Multiple SubNyquist Sampling Encoding)" which was developed in Japan. The MUSE type has 1125 scanning lines and a screen aspect ratio of 16:9. Thus, the present NTSC type television receiver having 525 scanning lines and a 4:3 screen aspect ratio can not receive the MUSE type television signal. Accordingly, a television signal converter has been required to convert a MUSE type television signal into an NTSC type television signal. This allows reception of the MUSE type television signal by an NTSC type television receiver. The prior art is disclosed in Japanese laid-open Pat. No. Hei 2-291790. In the conventional television signal converter, scanning line conversion, scanning line interpolation, and speed conversion, must be performed twice in order to convert a television signal having a 16:9 aspect ratio and 1125 scanning lines into a television signal having a predetermined aspect ratio different from the 16:9 aspect ratio and say 350 scanning lines. As a result, a long-standing problem in the conventional television signal converter is that the signal process for converting the MUSE type television signal to various NTSC type television signals having different aspect ratios and scanning line numbers is complex. Moreover, the circuit is complicated.

SUMMARY OF THE INVENTION

Accordingly, an object of the present invention is to provide a television signal converting apparatus which can simplfy the signal process for converting a MUSE type television signal into an NTSC type television signal.

To achieve the above-mentioned object, the apparatus according to the present invention comprises:

an adaptive scanning line number converting means for separating a predetermined television signal into chrominance and luminance signals by the different vertical correlations according to a screen mode; and a time axis adjusting means for sampling the luminance and chrominance signals from the adaptive scanning line number converting means by the scanning line number corresponding to the screen mode and for horizontally lengthening the sampled luminance and chrominance signals.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
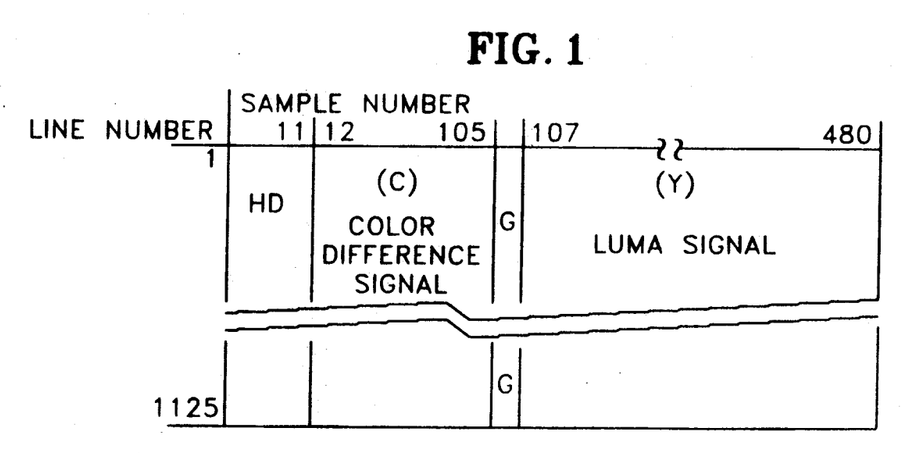
FIGS. 1A to 1C show formats of a MUSE signal.
Figure 1B:
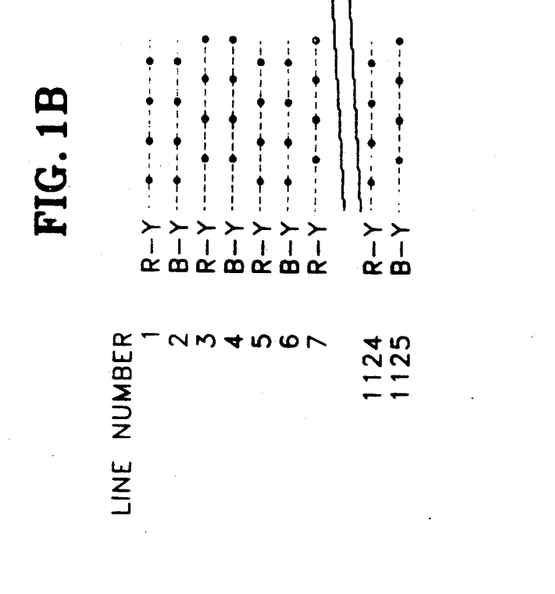
Figure 1C:
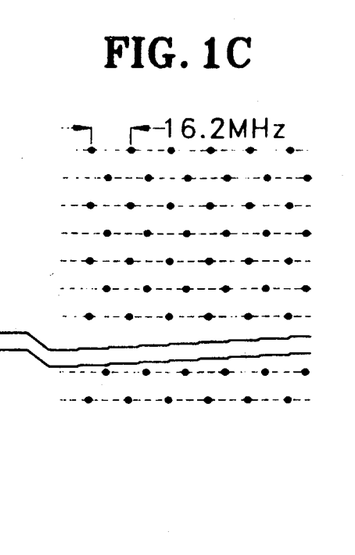

FIGS. 1A to 1C show the formats of the MUSE type television signal (hereinafter, referred to as "MUSE signal"). FIG. 1A shows the signal arragement of a MUSE signal. FIG. 1B shows a detailed sample arrangement for the color information shown in FIG. 1A, where R-Y is a chrominance sample of the luminance subtracted from the red color component and B-Y is a chrominance sample of the luminance subtracted from the blue color component. FIG. 1C shows a sample arrangement for the luminance information shown in FIG. 1A.

Figure 2:
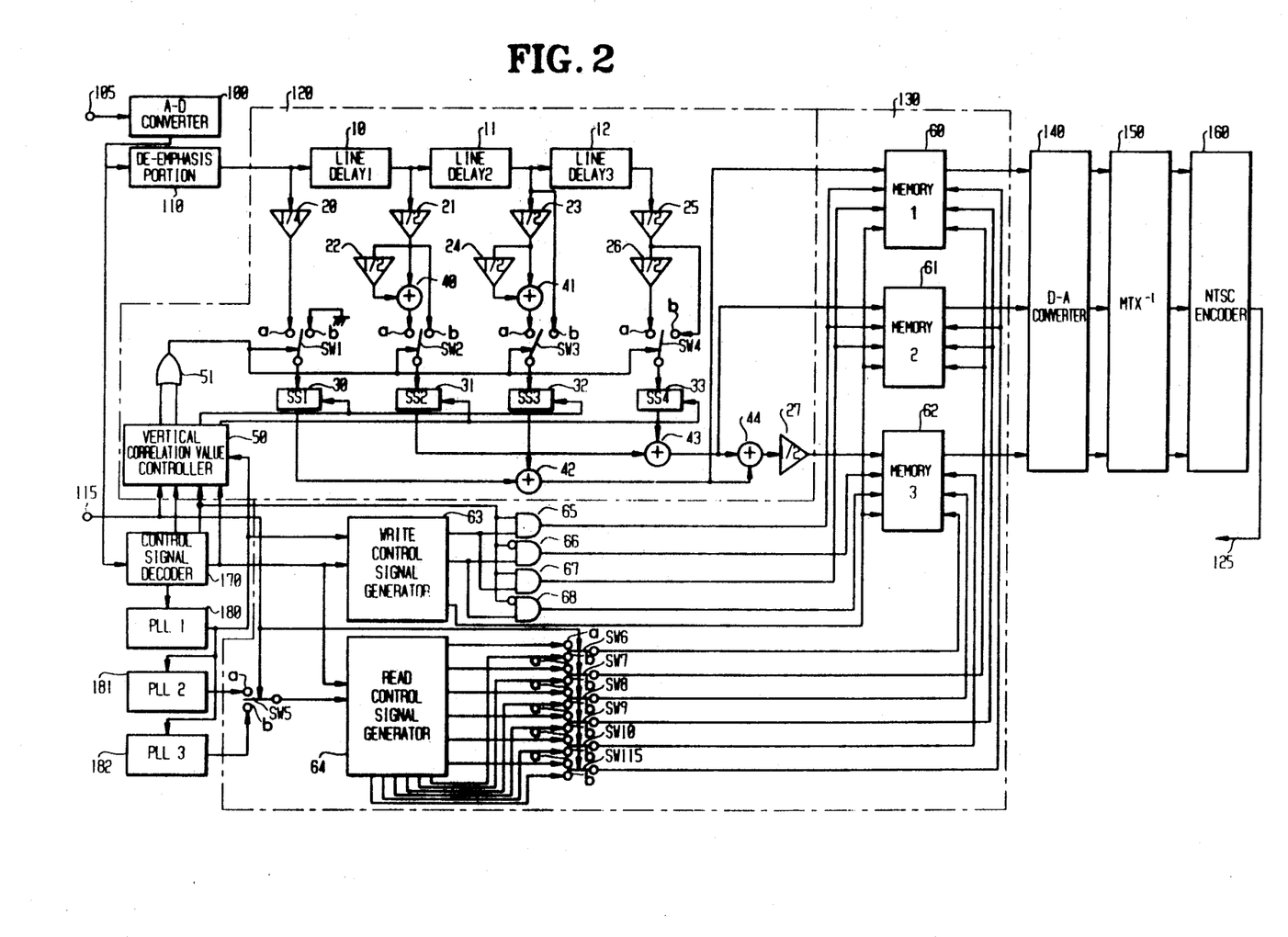
FIG. 2 is a circuit diagram showing an embodiment of a television signal converting apparatus according to the present invention.

FIG. 2 is a circuit diagram of an embodiment of a television signal converting apparatus according to the present invention. In FIG. 2, 100 is an analog to digital converter (hereinafter referred to as A-D converter), 110 is a de-emphasis portion, 120 is an adaptive scanning line interpolating portion, 130 is a time axis lengthening portion, 140 is a digital to analog (hereinafter referred to as D-A) converter, 150 is an inverse matrix portion, 160 is an NTSC encoder, 170 is a control signal decoder, 180 to 182 are frist to third phase-locked loops (hereinafter referred to as PLLs). Further, 10 to 12 are first to third line delays, 20 is a 12 dB attenuator, 21 to 26 are 6 dB attenuators, 30 to 33 are subsample shifters (hereinafter referred to as SSs), 40 to 44 are adders, 50 is a vertical correlation value controller, 51 is an OR gate, 60 to 62 are first to third memories, 63 is a write control signal generator, 64 is a read control signal generator, 65 to 68 are AND gates, and SW1 to SW11 are control switches.

Figure 3A:
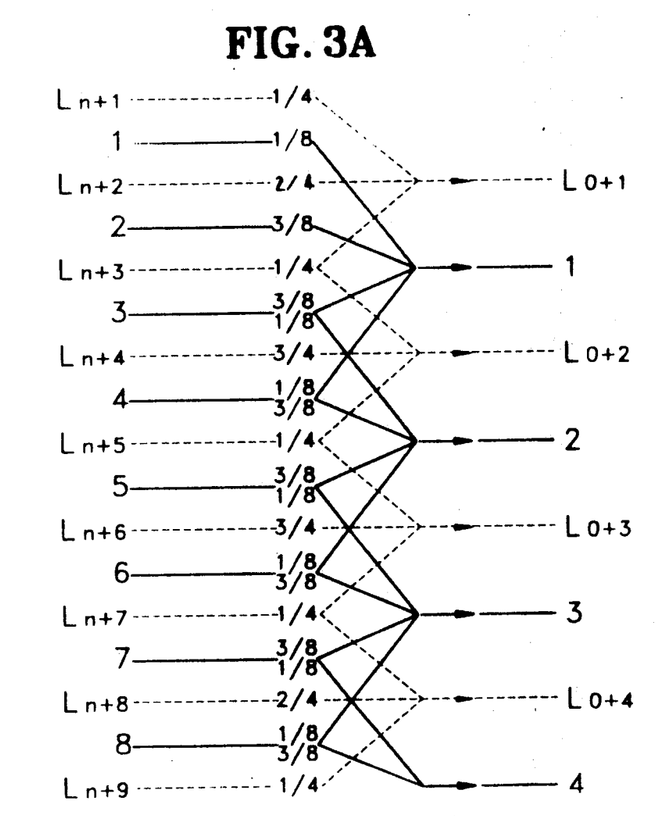
FIGS. 3A to 3D are state diagrams showing the conversion process of scanning line number to explain the operation of the adaptive scanning line number converting means in FIG. 2.
Figure 3B:
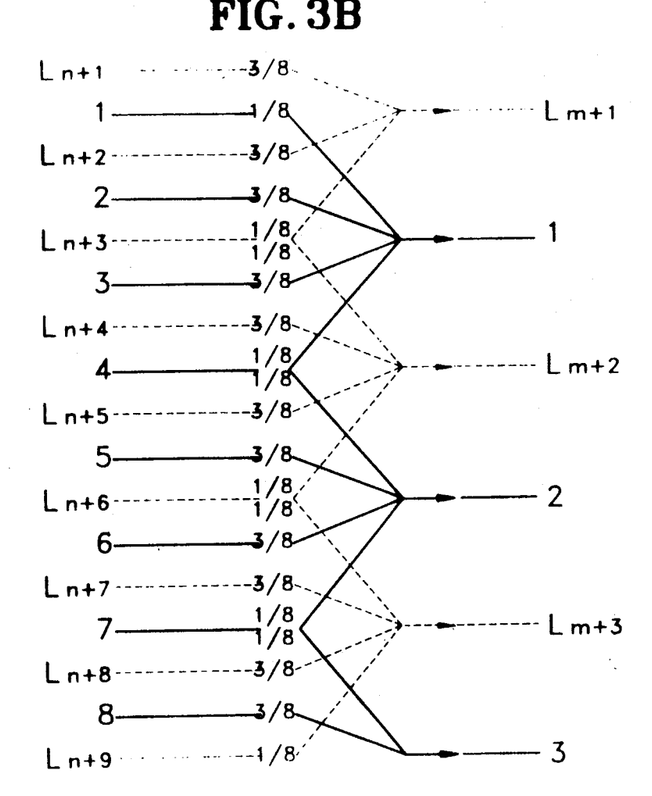

FIGS. 3A to 3D are state diagrams showing the conversion process of the scanning line number of the luminance and chrominance signals in respective screen modes, where the solid lines are signals in even fields, and the dotted lines are signals in odd fields. FIGS. 3A and 3B show scanning line number changing states of a luminance signal in zoom up and wide screen modes, respectively, while FIGS. 3C and 3D respectively show scanning line number changing states of a chrominance signal in zoom up and wide scrren modes.

Figure 4A:
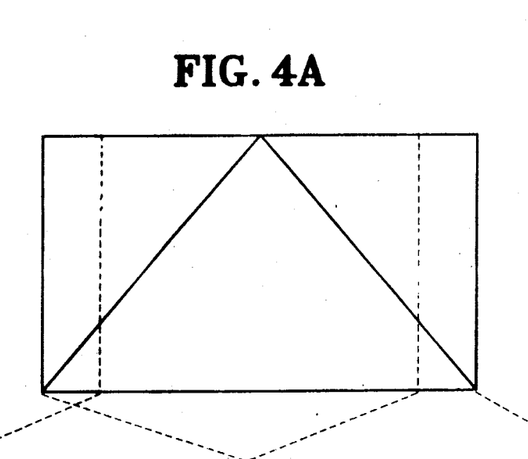
FIGS. 4A to 4C are state diagrams of complete screens according to screen mode.
Figure 4B:
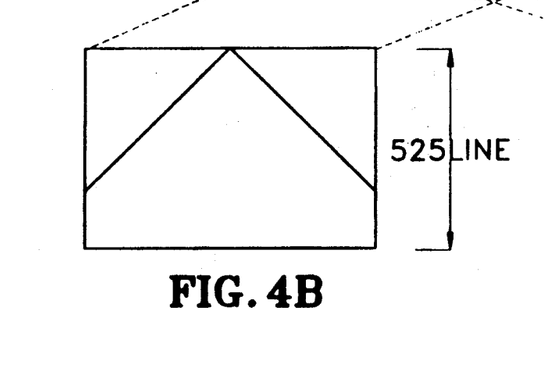
Figure 4C:
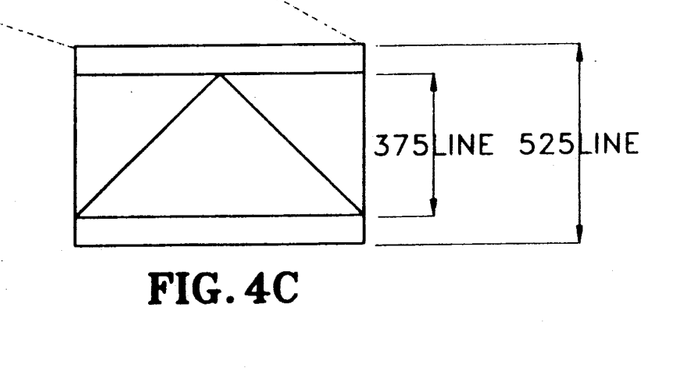

FIGS. 4A to 4C show screen display states for explaining the present invention. FIG. 4A shows a display state of a screen for a MUSE signal. FIG. 4B shows a screen display state for a converted television signal in a zoom up mode and FIG. 4C shows a screen display state for a converted television signal in a wide screen mode.

Now, the operation of the circuitry of FIG. 2 is described in detail with reference to FIGS. 3A to 4C. A first input terminal 105 is connected to a MUSE signal source (not shown) to receive an analog MUSE signal.

An A-D converter 100 converts the analog MUSE signal received through the first input terminal 105 into a digital MUSE signal and supplies the converted digital MUSE signal to a control signal decoder 170 and a de-emphasis portion 110.

The de-emphasis portion 110 attenuates a high-frequency component gain emphasized in the digital MUSE signal and furnishes the high-frequency component gain attenuated digital MUSE signal to a first line delay 10 and a 12 dB attenuator 20 included in the adaptive scanning line interpolating portion 120.

Meanwhile, a second input terminal 115 is connected to a system controller (not shown) or a key switch (not shown) to receive a conversion mode command in the form of a logic signal.

The control signal decoder 170 decodes a control signal included in the digital MUSE signal from A-D converter 110 and generates a field distinguishing signal, a luminance/chrominance recognizing signal, a subsample shifting control signal, and a data clock. Further, the control signal decoder 170 supplies the field distinguishing signal to a vertical correlation value controller 50, a write control signal generator 63, and a read control signal generator 64, and transmits the luminance/chrominance recognizing signal to the vertical correlation value controller 50 and AND gates 65 to 68. In addition, the control signal decoder 170 supplies the subsample shifting control signal to the vertical correlation value controller 50 and a data clock train to a first PLL portion 180.

The first PLL portion 180 generates a second data clock train which is synchronized with the data clock train from the control signal decoder 170, and feeds the generated second data clock train to the vertical correlation value controller 50, second and third PLL portions 181 and 182, and write control signal generator 63. The frequency of the second data clock train which is higher than that of the data clock train generated in control signal decoder 170 is approximately 32.4 MHz.

A second PLL portion 181 generates a third data clock train of which synchronization is made with the second data clock train received from first PLL 180, and provides the generated third data clock train to the selective contact a of a fifth control switch SW5. The third data clock train has a lower frequency, i.e., 11.34 MHz, than that of the second data clock train, and is used as a reference clock train for a zoom up screen mode.

The third PLL portion 182 generates a fourth data clock train which is synchronized with the second data clock train from the first PLL portion 180, and supplies it to the selective contact b of the fifth control switch SW5. The fourth data clock train has a 15.12 MHz frequency which is lower than that of the second data clock train and different from that of the third data clock train, and is used as a reference clock train for a wide screen mode.

The adaptive scanning line interpolating portion 120 converts the number of scanning lines of the digital MUSE signal into a different scanning line number depending on a different vertical correlation according to a conversion mode command supplied through a second input terminal 115, and separates the digital MUSE signal into luminance and chrominance signals.

The operation of the adaptive scanning line interpolating portion 120 will be described in detail. A first line delay 10 delays the digital MUSE signal from the de-emphasis portion 110 for one horizontal period, and supplies it to a second line delay 11 and a first 6 dB attenuator 21. The second line delay 11 again delays the delayed digital MUSE signal supplied from first line delay 10 for one horizontal period, and supplies it to the selective contact b of a third control switch SW3, a third line delay 12 and a third 6 dB attenuator 23. The third line delay 12 again delays the digital MUSE signal supplied from the second line delay 11 for one horizontal period, and supplies it to a fifth 6 dB attenuator 25. The 12 dB attenuator 20 attenuates the amplitude of the digital MUSE signal supplied from the de-emphasis portion 110 to be a quarter of its input amplitude, and supplies it to the selective contact a of the first control switch SW1. The first 6 dB attenuator 21 attenuates the amplitude of the delayed digital MUSE signal supplied from the first line delay 10 to be half its input amplitude, and provides it to the selective contact b of the second control switch SW2, a first input terminal of a first adder 40, and a second 6 dB attenuator 22. The second 6 dB attenuator 22 further attenuates the attenuated digital MUSE signal supplied from the first 6 dB attenuator 21 to be half again in amplitude, and supplies it to the second input terminal of the first adder 40. The first adder 40 sums two attenuated digital MUSE signals from first and second 6 dB attenuators 21 and 22, and supplies the result to the selective contact a of the second control switch SW2. Then, the output of the first adder 40 has an amplitude corresponding to three-quarter output of the first line delay 10. The second control switch SW2 selects one of the digital MUSE signals supplied to its selective contacts a and b, from either first 6 dB attenuator 21 or first adder 40, and supplies the selected signal to a second SS 31. The first control switch SW1 selects either an attenuated digital MUSE signal from the 12 dB attenuator 20 which is supplied to its selective contact a, or the ground potential at its selective contact b, and supplies the selected signal to a first SS 30. The third 6 dB attenuator 23 attenuates the amplitude of the digital MUSE signal from the second line delay 11 to be half its input amplitude, and then furnishes it to the first input terminal of a second adder 41 and a fourth 6 dB attenuator 24. The second adder 41 adds the 12 dB attenuated digital MUSE signal from fourth 6 dB attenuator 24 to the halved MUSE signal from third 6 dB attenuator 23, and supplies the result to the selective contact a of the third control switch SW3. The third control switch SW3 selects one of the digital MUSE signals from second adder 41 and the second line delay 11, which are supplied to its two selective contacts a and b, and supplies the selected signal to a third SS 32. A fifth 6 dB attenuator 25 attenuates the delayed digital MUSE signal from third line delay 12 to be half its input amplitude, and supplies it to the selective contact b of fourth control switch SW4 and a sixth 6 dB attenuator 26. The sixth 6 dB attenuator 26 further attenuates the halved digital MUSE signal to be half again in amplitude, and supplies the 12 dB attenuated digital MUSE signal to the selective contact a of fourth control switch SW4. The fourth control switch SW4 selects either the 12 dB attenuated digital MUSE signal from sixth 6 dB attenuator 26 which is supplied to its selective contact a, or the halved digital MUSE signal from fifth 6 dB attenuator 25 which is supplied to its selective contact b, and supplies the selected signal to a fourth SS 33.

First to fourth SSs 30 to 33 delay digital MUSE signals from the corresponding control switches SW1 to SW4, respectively, for one subsample period. The third adder 42 adds the digital MUSE signal from the first SS 30 to the digital MUSE signal from the third SS 32, and supplies the result to the first input terminal of the fifth adder 44 and a first memory 60. The fourth adder 43 adds the digital MUSE signal from the second SS 31 to the digital MUSE signal from the fourth SS 33, and supplies the result to the second input terminal of fifth adder 44 and a second memory 61. The fifth adder 44 adds the digital MUSE signal from the third adder 42 to the digital MUSE signal from the fourth adder 43, and supplies the result to a third memory 62 through a seventh 6 dB attenuator 27. Here, in the output of third adder 42, a B-Y signal and a luminance signal appear at the odd horizontal scanning interval, while an R-Y signal and a luminance signal appear at the even horizontal scanning interval. At the output of fourth adder 43, an R-Y signal and a luminance signal exist in the odd horizontal scanning interval, while an R-Y signal and a luminance signal exist in the even horizontal scanning interval. At the output of fifth adder 44, R-Y and B-Y chrominance signals and a luminance signal appear at the horizontal scanning interval. A seventh 6 dB attenuator 27 is provided to reduce the luminance signal by one half since it is two times the amplitude of the chrominance signal. The vertical correlation value controller 50 generates first and second subsample shifting clock trains and first and second correlation value control signals to be supplied to the first to fourth SSs 30 to 33 by reception of a converting mode command from the second input terminal 115, a second data clock train from the first PLL portion 180, and a field distinguishing signal, a luminance/chrominance recognizing signal and a subsample shifting control signal from the control signal decoder 170. The first subsample shifting clock train is supplied to the clock terminals of the first and third SSs 30 and 32. Meanwhile, the second subsample shifting clock train is fed to the clock terminals of the second and fourth SSs 31 and 33. The first and second subsample shifting clock trains are 180° out of phase. Only when the vertical correlation value controller 50 receives an even field chrominance signal in the zoom up mode its first correlation value control signal is a logic "1" (+5 V) and for other cases is a logic "0" (0 V). The second correlation value control signal in the vertical correlation value controller 50 is a logic "1" (+5 V) only when the applied signal thereto is an even field luminance signal in the zoom up mode, and is a logic "0" (0 V) for other cases. If either of the first or second correlation value control signal is a logic "1" (+5 V), an output of OR gate 51 becomes a logic "0", and thereby enabling the b contacts of first to fourth control switches SW1 to SW4 to be shorted.

As a result of the above operation, first to fourth control switches SW1 to SW4 in the adaptive scanning line interpolating portion 120 establish the respective values shown in table 1, when the output signal of de-emphasis portion 110 is a logic "1". Here, considering that the amplitude of the luminance signal is halved by seventh 3 dB attenuator 27, it also equals half the amplitude of the chrominance signal.

| mode | field | SW1 odd | SW1 even | SW2 odd | SW2 even | SW3 odd | SW3 even | SW4 odd | SW4 even |
|---|---|---|---|---|---|---|---|---|---|
| ZOOM | luminance | ½ | 0 | ½ | ½ | ½ | ½ | ½ | ½ |
|  | R-Y | ½ | 0 |  |  | ½ | 1 |  |  |
|  | B-Y |  |  | ½ | ½ |  |  | ½ | ½ |
| WIDE | luminance | ½ | ½ | ½ | ½ | ½ | ½ | ½ | ½ |
|  | R-Y | ½ | ½ |  |  | ½ | ½ |  |  |
|  | B-Y |  |  | ½ | ½ |  |  | ½ | ½ |

The time axis lengthening portion 130 receives luminance and chrominance signals on scanning lines corresponding to the zoom up and wide modes, from the outputs of the adaptive scanning line converter 120, and converts them into NTSC luminance and chrominance signals as shown in FIGS. 3A to 3D.

Referring to FIGS. 3A to 3D, the conversion process of a luminance scanning line for a zoom up mode is shown in FIG. 3A, in which the left side shows the MUSE scanning lines and the right side shows the interpolation-converted NTSC scanning lines. At first, when MUSE luminance signals on the solid lines numbered 1, 2, 3 and 4 in scanning lines of FIG. 3A are, respectively, at the corresponding first to third line delays 10 to 12 in the adaptive scanning line number converter 120 of FIG. 2, the above four scanning lines consisting of first to fourth solid lines are interpolation-converted into one line of the right solid line in FIG. 3A by attenuators 20 to 26, adders 40 to 44, control switches SW1 to SW4, subsample shifters 30 to 33, and attenuator 27, and the luminance signal on the interpolation-converted line is supplied to third memory 62.

The conversion process for the scanning lines 3 to 6, and 5 to 8, etc. of the left solid lines in FIG. 3A is otherwise carried out in the same manner as the above process for the scanning lines 1 to 4 so that lines 2 and 3 of the solid lines at the right are produced.

Also in FIG. 3A, since the scanning lines indicated with dashed lines are interlaced with the solid scanning lines, 1 the converted scanning lines are positioned between the solid lines, as seen in the dashed scanning lines on the right side. To satisfy such a relation, when luminance signals on the dotted scanning lines $L_{n+1}$, $L_{n+2}$, and $L_{n+3}$ at the left side are, respectively, at the corresponding first to third line delays 10 to 12 in the adaptive scanning line interpolation portion 120, they are converted into one dotted scanning line $L_{o+1}$ of the right side in the adative scanning line interporating portion 120.

By repeating the above process for scanning lines $L_{n+3}$, $L_{n+4}$ and $L_{n+5}$, and $L_{n+5}$, $L_{n+6}$ and $L_{n+7}$, they can be respectively converted into scanning lines $L_{o+2}$, $L_{o+3}$ on the right side of FIG. 3A, thereby completing the screen conversion for one frame per 525 scanning lines. At this time, the switch SW1 switches to its contact b, thereby being at ground potential.

Meanwhile, as shown in FIG. 3B, in the conversion process of scanning lines for a wide screen, each converted scanning line comes from four MUSE scanning lines in the solid-and-dashed-lined fields. This process is the same as that depicted in FIG. 3A.

Figure 3C:
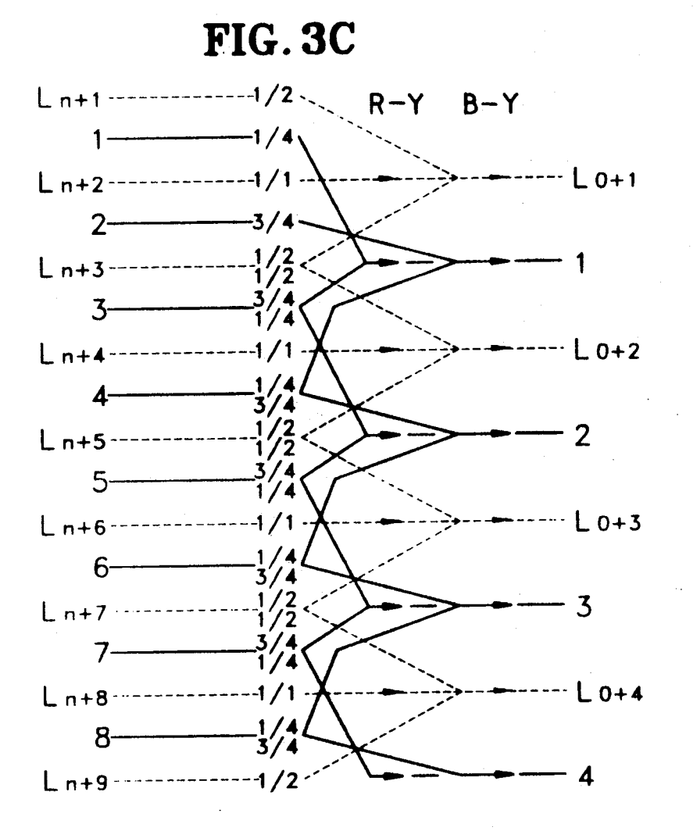
Figure 3D:
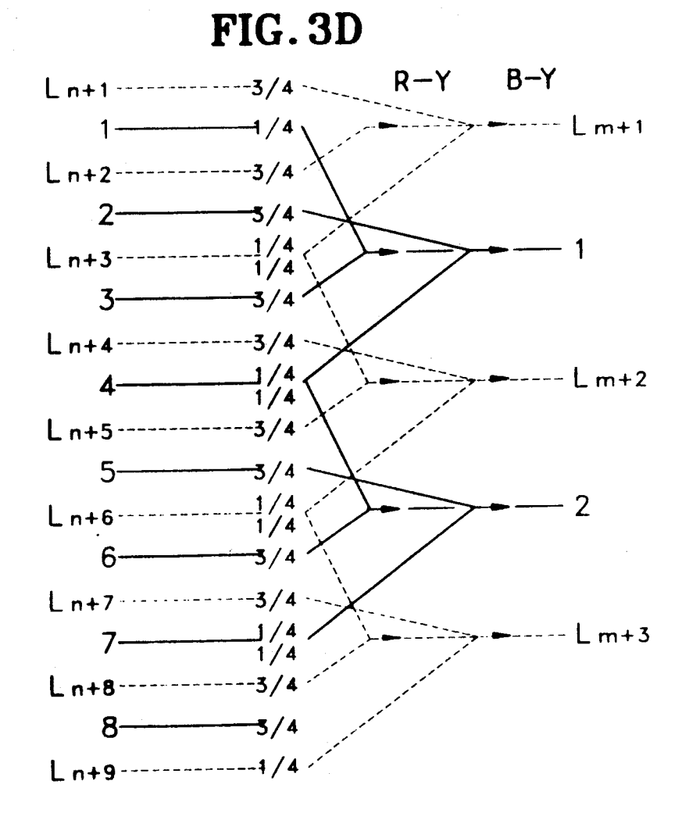

FIGS. 3C and 3D consider the conversion process of chrominance scanning line number. In the solid lined field in FIG. 3C for the zoom mode, MUSE chrominance signals corresponding to the first and third scanning lines on the left side are converted into the color difference signal R-Y corresponding to the first scanning line on the right by attenuators 20, 24, and 25, and adders 41 and 42, the a contacts of switches SW1 and SW3, and first and third SSs SS1 and SS3. This happens when the MUSE chrominance signals on the left sided first, second and third scanning lines are, respectively, at the corresponding first to third line delays 10 to 12 of the adaptive scanning line converter 120 of FIG. 2. Then, the converted R-Y signal is applied to the first memory 60. By such a step, the second and fourth scanning lines are converted into the color difference signal B-Y. The converted B-Y signal is then supplied to the second memory 61. Also, the dashed-lined field of FIG. 3C is interlaced with the solid-lined field of FIG. 3C, and the scanning lines of the dashed-lined field are positioned between those of the solid-lined field. According to this principle, when the MUSE chrominance signals on scanning lines $L_{n+1}$, $L_{n+2}$ and $L_{n+3}$ of the left side of FIG. 3C are, respectively, at the corresponding first, second and third line delays 10, 11 and 12 of the adaptive scanning line number converter 120 in FIG. 2, switches SW1 to SW4 cause their b contacts to close. The color difference signal R-Y corresponding to $L_{o+1}$ on the right side of FIG. 3C is the direct result of $L_{n+2}$. Also, the color difference signal B-Y corresponding to $L_{o+1}$ results from the converted scanning lines $L_{n+1}$ and $L_{n+3}$ by attenuators 21 and 25, switches SW2 and SW4, SSs 31 and 33, and adder 43. Additionally, the color difference signal B-Y is supplied to the second memory 61.

As described above, the solid-lined field and the dashed-lined field are converted, completing one chrominance frame for a zoom up screen per 525 scanning lines. The color difference signal for a wide screen is also shown in FIG. 3D and the converting process is the same as that of the solid-lined field of FIG. 3C.

The NTSC luminance and chrominance signals formed as described above are lengthened in the horizontal axis direction of the converting type and are supplied to the D-A converter 140. The detailed operation is described as follows. Upon receiving the color write control signal and the color write address reset signal from AND gates 65 and 67 and the write clock train from write control signal generator 63, first and second memories 60 and 61 perform a write operation every two or three scanning lines only during the color signal input interval of the horizontal scanning period, thereby internally storing the R-Y and B-Y signals from third and fourth adders 42 and 43. Further, first and second memories 60 and 61 read out the internally stored R-Y and B-Y by the color read clock train, the color read control signal and the color read address reset signal from the seventh, ninth, and eleventh control switches SW7, SW9, and SW11. This action generates the horizontally lengthened R-Y and B-Y signals having 525 interlaced scanning lines as shown in FIG. 3C, or the 350 scanning lines in FIG. 3D, which is a predetermined number less than 525. Upon receiving the luminance write control signal and the luminance write address reset signal from AND gates 66 and 68 and the write clock train from write control signal generator 63, third memory 62 performs the write operation every two or three scanning lines only during the luminance signal input interval of the horizontal scanning period, thereby internally storing the luminance signal from fifth adder 44. Further, third memory 62 reads out the internally stored luminance signal upon reception of the luminance read control signal, the luminance read address reset signal, and a luminance read clock train from the sixth, eighth, and tenth control switches SW6, SW8, and SW10, thereby generating the horizontally lengthened luminance signal having the 525 interlaced scanning lines as shown in FIG. 3A, or the 350 scanning lines in FIG. 3B, which is a predetermined number less than 525. The write control signal generator 63 generates a write clock train, a write control signal and a write address reset signal upon reception of a second data clock train from first PLL portion 180 and a field control signal from control signal decoder 170. Here, the write address reset signal is supplied to one input terminal of each of AND gates 67 and 68, while the write control signal is supplied to one input terminal of each of AND gates 65 and 66. The AND gate 65 performs an AND-gating operation of the inverted luminance/chrominance recognizing signal and the write control signal at its input terminals to generate a color write control signal. The AND gate 66 AND-gates the luminance/chrominance recognizing signal and the write control signal at its input terminals to generate a luminance write control signal. The AND gate 67 AND-gates the inverted luminance/chrominance recognizing signal and the write address reset signal at its input terminals to generate a color write address reset signal. The AND gate 68 AND-gates the luminance/chrominance recognizing signal and the write address reset signal at its input terminals to generate a luminance write control signal.

The read control signal generator 64 generates the luminance and chrominance signal read clock trains, read control signal, and read address reset signal for a zoom up mode or a wide mode in response to the third or fourth data clock train from seventh control switch SW7 and the field control signal from control signal decoder 170. In more detail, when the third data clock train is applied to the fifth control switch SW5, all the signals for the zoom up mode, i.e., the luminance read control signal, the color read control signal, the luminance read address reset signal, the color read address reset signal, the luminance read clock train, and the color read clock train are respectively produced from the first to sixth output terminals of read control signal generator 64, and are supplied to the a contacts of sixth to eleventh control switches SW6 to SW11. On the contrary, when the fourth data clock train is applied through the fifth control switch SW5 to the read control signal generator 64, the corresponding wide mode signals are respectively generated from seventh to twelfth terminals of the read control signal generator 64, and then are supplied to the b contacts of the sixth to eleventh control switches SW6 to SW11. The sixth to eleventh control switches SW6 to SW11 are switched depending on the logic state of the converting mode command from the second input terminal 115.

The D-A converter 140 receives digital R-Y, B-Y, and luminance signals from the first to third memories 60, 61 and 62 of the time axis lengthening portion 130, and converts them into an analog R-Y signal, an analog B-Y signal, an analog luminance signal to supply them to inverse matrix portion 150.

The inverse matrix portion 150 combines the analog R-Y signal, the analog B-Y signal and the analog luminance signal from D-A converter 140 and generates three primary color signals R, G, and B.

The NTSC encoder 160 encodes the R, G, and B signals from inverse matrix portion 150 to be NTSC video signals, and sends the encoded video signals to its output terminal 125.

The video signal from the output terminal 125 of NTSC encoder 160 has video information for a zoom up mode as shown in FIG. 4B, or for a wide mode as shown in FIG. 4C.

In FIG. 2, first, second and third line delays 10, 11 and 12, 12 dB attenuator 20, first through seventh 6 dB attenuators 21 to 27, first SS through fourth SS 30 to 33, first through fourth control switches SW1 to SW4, and first through fifth adders 40 to 44 form a digital filter.

As described above, according to the present invention, there are advantages in that the MUSE signal can be converted into an NTSC television signal using a vertical correlation-type filter and memory, and also into an NTSC television signal having a different number of scanning lines by changing the correlation.

What is claimed is:

1. A television signal converting apparatus for converting a MUSE type television signal having 1125 scanning lines to another type television signal having a lower number of scanning lines, comprising:

a first input terminal for receiving an analog MUSE signal;

a second input terminal for receiving a conversion mode command;

an A-D converter for converting the analog MUSE signal received in said first input terminal into a digital MUSE signal;

a control signal decoder for decoding a data clock train and control signals in the digital MUSE signal from said A-D converter;

adaptive scanning line number converting means for generating a luminance signal and chrominance signals having a different vertical correlation according to the conversion mode command received from said second input terminal, and according to the control signals from said control signal decoder;

second and third PLLs (Phase-locked loops) for generating third and fourth data clock trains synchronized with the decoded data clock train from said control signal decoder and having different frequencies according to a screen mode in the conversion mode command;

a fifth control switch for selecting a third data clock train supplied from said second PLL or a fourth data clock train supplied from said third PLL by the screen mode of conversion mode command from said second input terminal;

time axis adjusting means for sampling the luminance signal and chrominance signals by a scanning line number corresponding to the screen mode, among the luminance signal and chrominance signals supplied from said adaptive scanning line number converting means according to the control signal and data clock train supplied from said control signal decoder and the data clock train supplied from said fifth control switch, and for horizontally lengthening the sampled luminance and chrominance signals; and a D-A converter for converting the output of said time axis adjusting means into an analog signal.

2. A television signal converting apparatus as claimed in claim 1, wherein said adaptive scanning line number converting means comprises:

first, second and third line delays connected in series with each other for delaying the digital MUSE signal supplied from said A-D converter, by one line interval per each said line delay:

first to fourth attenuating means for attenuating the outputs of said A-D converter and said first, second and third line delays by different attenuating rates according to the screen mode and field;

a first adder for generating a first chrominance signal by mixing the outputs of said first and third attenuating means and supplying the generated first chrominance signal to said time axis adjusting means;

a second adder for generating a second chrominance signal by mixing the outputs of said second and fourth attenuating means and supplying the generated second chrominance signal to said time axis adjusting means; and a third adder for generating a luminance signal by summing the outputs of said first and second adders and supplying the generated luminance signal to said time axis adjusting means.

* * * * *

UNITED STATES PATENT AND TRADEMARK OFFICE
CERTIFICATE OF CORRECTION

PATENT NO. : 5,159,437
DATED : October 27, 1992
INVENTOR(S) : Gi-seok Lee

It is certified that error appears in the above-identified patent and that said Letters Patent is hereby corrected as shown below:

Col. 2, line 18, "arragement" should be --arrangement--.

Col. 2, line 55, "scrren" should be --screen--.

Col. 5, line 22, "in" should be --at--.

Signed and Sealed this

Tenth Day of January, 1995

Attest:

BRUCE LEHMAN

Attesting Officer  Commissioner of Patents and Trademarks